United States Patent [19]

Kuroda et al.

[11] 4,221,197
[45] Sep. 9, 1980

[54] MULTI-CYLINDER INTERNAL COMBUSTION ENGINE HAVING SIAMESED EXHAUST PORTS

[75] Inventors: Hiroshi Kuroda, Tokyo; Yasuo Nakajima, Yokosuka; Yoshimasa Hayashi, Yokohama; Haruo Fujino, Tokyo, all of Japan

[73] Assignee: Nissan Motor Company, Limited, Yokohama, Japan

[21] Appl. No.: 828,188

[22] Filed: Aug. 26, 1977

[30] Foreign Application Priority Data

Aug. 27, 1976 [JP] Japan .................... 51-101619

[51] Int. Cl.$^2$ .................................... F01L 1/34
[52] U.S. Cl. ........................... 123/316; 123/90.15
[58] Field of Search ............ 123/52 MB, 75 C, 75 E, 123/90.15, 90.16, 90.17, 90.18

[56] References Cited

U.S. PATENT DOCUMENTS

| | | | |
|---|---|---|---|
| 3,714,932 | 2/1973 | Meacham et al. | 123/75 E |
| 3,845,746 | 11/1974 | Elsbett | 123/52 MB |
| 3,938,482 | 2/1976 | Akamatsu | 123/75 C |
| 3,953,969 | 5/1976 | Mori et al. | 123/75 E |
| 4,068,630 | 1/1978 | Bennett et al. | 123/75 C |

*Primary Examiner*—Ronald H. Lazarus
*Attorney, Agent, or Firm*—Schwartz, Jeffery, Schwaab, Mack, Blumenthal & Koch

[57] ABSTRACT

A multi-cylinder internal combustion engine has siamesed exhaust ports each of which is shared by two adjacent cylinders. The valve timings of intake and exhaust valves of the two cylinders are so adjusted that flow of the exhaust gases from one cylinder is not obstructed in the siamesed exhaust port by the flow of the exhaust gases from the other cylinder in order to prevent power outputs of the two cylinders from being unbalanced.

22 Claims, 4 Drawing Figures

MULTI-CYLINDER INTERNAL COMBUSTION ENGINE HAVING SIAMESED EXHAUST PORTS

BACKGROUND OF THE INVENTION

This invention relates to the improvement in a multi-cylinder internal combustion engine having a siamesed exhaust port which is shared by two adjacent cylinders of the engine.

SUMMARY OF THE INVENTION

It is the prime object of the present invention to provide an improved multi-cylinder internal combustion engine in which power outputs among a plurality of cylinders are prevented from being unbalanced to improve engine driveability and to decrease engine noise.

Another object of the present invention is to provide an improved multi-cylinder internal combustion engine in which the scavenging and charging efficiencies of all the cylinders are increased approximately to the same level.

A still further object of the present invention is to provide an improved multi-cylinder internal combustion engine in which the flow of exhaust gases from one of two adjacent cylinders is prevented from being obstructed in a siamesed exhaust port by the exhaust gas flow from the other cylinder.

A further object of the present invention is to provide an improved multi-cylinder internal combustion engine in which the backward flow of the exhaust gases from the exhaust system to the intake system is prevented to improve engine power output.

A still further object of the present invention is to provide an improved multi-cylinder internal combustion engine in which sufficient secondary air is admitted into the exhaust system in case of using a device for admitting the secondary air into the exhaust system by the action of pulsation of exhaust gases.

Other objects, features, and advantages of the multi-cylinder internal combustion engine in accordance with the present invention will become more apparent from the following description taken in conjunction with the attached drawings in which.

DETAILED DESCRIPTION OF PREFERRED EMBODIMENTS

It is well known that a multi-cylinder internal combustion engine having a plurality of cylinders is formed with a so-called siamesed exhaust port in which exhaust ports of at least two adjacent cylinders are joined together in a cylinder head. In other words, the siamesed exhaust port is shared by at least two adjacent cylinders. It will be understood that the siamesed exhaust port has a small surface area through which the exhaust temperature is released, as compared with the total surface area of two independent exhaust ports which are connected to the two adjacent cylinders.

In such an internal combustion engine having the siamesed exhaust port, the exhaust gases from the at least two adjacent cylinders are joined and mixed together within a period of time in which these exhaust gases still have a high temperature, or just after these exhaust gases are discharged from the cylinders. As a result, the temperature of the exhaust gas is maintained higher, and accordingly the high temperature exhaust gases are supplied to an exhaust gas purifying device, such as a catalytic converter, a thermal reactor or a heat retaining manifold, provided downstream of the exhaust port, improving an oxidation reaction in the purifying device.

On the other hand, however, the thus arranged engines have encountered the problems in which the scanvenging efficiencies of the two cylinders sharing the siamesed exhaust port are different from each other by the fact a mutual action or interference between the exhaust gases from the two cylinders is raised in the siamesed exhaust port. The interference is caused by the difference in the valve timings of the two cylinders sharing the siamesed exhaust port.

In this connection, the cylinder for which the scavenging efficiency is higher than the other cylinder is higher also in charging efficiency since the amount of gases remaining in the former cylinder is less than the latter cylinder. This difference in the charging efficiency of the two cylinders sharing the siamesed exhaust port causes unbalanced power outputs between the two cylinders, resulting in the generation of undesirable engine vibration and engine noise. Additionally, in an engine equipped with a device for admitting secondary air into the exhaust system thereof by using the pulsation of the exhaust gas pressure in the exhaust system, the amount of the secondary air is unavoidably decreased by irregular waves of exhaust gas pressure pulsation caused by the interference of the exhaust gases discharged from the adjacent two cylinders.

Figure 1:
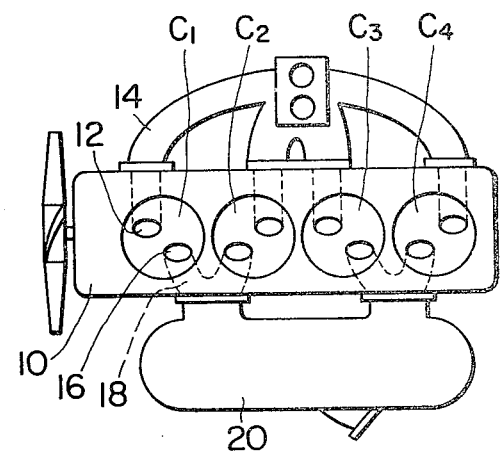
FIG. 1 is a schematic plan view of a conventional multi-cylinder internal combustion engine having siamesed exhaust ports.

The above-mentioned interference of the exhaust gases will be explained in detail with reference to FIG. 1. FIG. 1 shows a four-stroke cycle type multi-cylinder internal combustion engine having an engine proper 10 in which first to fourth cylinders $C_1$ and $C_4$ are formed. Each cylinder is communicable through an intake valve 12 with an intake manifold 14. Furthermore, the cylinder is communicable through an exhaust valve 16 with a siamesed exhaust port 18 in which the exhaust ports connected to the two adjacent cylinders are joined in the cylinder head (no numeral) forming part of the engine proper 10. The siamesed exhaust port 18 is connected to an exhaust gas purifying device such as a thermal reactor 20. The exhaust gas purifying device may be catalytic converter or an exhaust manifold functioning to thermally oxidize the noxious constituents in the exhaust gases. In the thus arranged engine, when the firing order is $C_1$-$C_3$-$C_4$-$C_2$, the order of the strokes of the engine is as follows:

| $C_1$ | $C_2$ | $C_3$ | $C_4$ |
| --- | --- | --- | --- |
| intake | compression | exhaust | expansion |
| ↓ | ↓ | ↓ | ↓ |
| compression | expansion | intake | exhaust |
| ↓ | ↓ | ↓ | ↓ |

-continued

| $C_1$ | $C_2$ | $C_3$ | $C_4$ |
|---|---|---|---|
| expansion | exhaust | compression | intake |
| ↓ | ↓ | ↓ | ↓ |
| exhaust | intake | expansion | compression |

The interval from the exhaust stroke of the first cylinder $C_1$ to the exhaust stroke of the second cylinder $C_2$ is three times of 180°, i.e., 540° in terms of crank angle, since the exhaust stroke order is in the sequence of $C_1 \rightarrow C_3 \rightarrow C_4 \rightarrow C_2$, whereas the interval from the exhaust stroke of the second cylinder $C_2$ to the exhaust stroke of the first cylinder $C_1$ is only 180°, since the exhaust order is $C_2 \rightarrow C_1$. Therefore, at the joining portion of the siamese exhaust port 18, the maximum value of the exhaust pressure occurs repeatedly at the intervals of crank angles of 540° and 180°.

It is to be noted that a large part of the exhaust gases blows off at a high speed at an initial period of opening of the exhaust valve, called "blow down". Hence, the amount of exhaust gases discharged from the cylinder is gradually decreased toward the closing of the exhaust valve. Accordingly, it is desirable that the flow of the exhaust gases is disturbed as little as possible until the exhaust gas is completely discharged from the cylinder or until the exhaust valve is closed.

As is apparent, a relatively long time interval exists from the exhaust stroke of the first cylinder $C_1$ to the exhaust stroke of the second cylinder $C_2$, whereas the time interval is considerably short from the exhaust stroke of the second cylinder $C_2$ to the exhaust stroke of the first cylinder $C_1$. Accordingly, the exhaust gases is the first cylinder $C_1$ starts to discharge at a high pressure of the blow down before the exhaust gases in the second cylinder $C_2$ are completely discharged. Thus, when the exhaust gases from the two adjacent cylinders $C_1$ and $C_2$ collide with each other in the siamesed exhaust port 18, flow of the exhaust gases from the cylinder $C_2$ is prevented by the exhaust gas flow from the cylinder $C_1$ since the former exhaust gas flow is lower in pressure than the latter exhaust gas flow. This results in the fact that the scavenging efficiency of the second cylinder $C_2$ is lower than that of the first cylinder $C_1$. Additionally, a backward flow of the exhaust gases may occur from the exhaust system through the combustion chamber to the intake system when the intake valve of the second cylinder $C_2$ starts to open. Consequently, the combustion of the charge in the second cylinder $C_2$ is deteriorated as compared with that in the first cylinder $C_1$. It will be understood that also the above-mentioned exhaust gas backflow contributes to a decrease of the power output of the second cylinder $C_2$ and therefore to an unbalance in the power outputs between the two adjacent cylinders $C_1$ and $C_2$. Further, due to this unbalance, there occur drawbacks that the engine undesirably vibrates as mentioned above and produces noises as discussed before.

This kind of exhaust interference also occurs similarly in the third cylinder $C_3$ and the fourth cylinder $C_4$. In the case of the four cylinder internal combustion engine having the firing order of $C_1$-$C_3$-$C_4$-$C_2$, it is usual that the combustion in the two end cylinders i.e., the first and fourth cylinders $C_1$ and $C_4$ is satisfactory while the combustion in the central cylinders, i.e., the second and third cylinders $C_2$ and $C_3$ is deteriorated. It will be understood that this problem is not limited to the four cylinder engine, but is common in all multi-cylinder internal combustion engine such as six cylinder engines or eight cylinder engines having siamesed exhaust ports.

Figure 2:
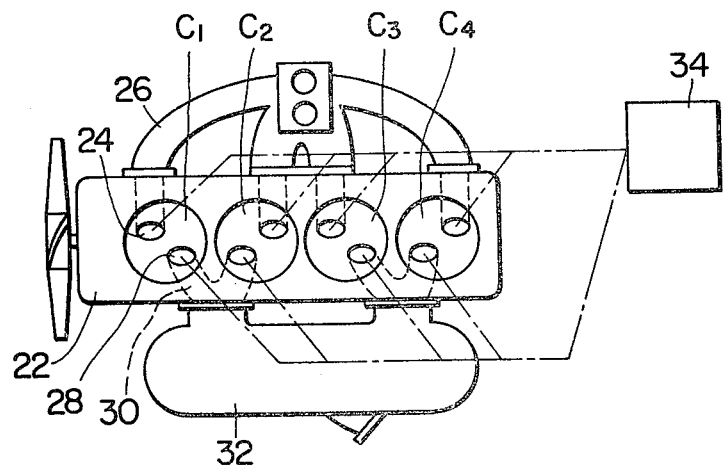
FIG. 2 is a schematic plan view of a preferred embodiment of a multi-cylinder internal combustion engine in accordance with the present invention.

Referring now to FIG. 2, a preferred embodiment of a four-stroke cycle, four cylinder internal combustion engine according to the present invention is shown including an engine proper 22 in which four cylinders $C_1$ to $C_4$ are formed. A combustion chamber (not shown) is formed at the upper portion of each cylinder. The combustion chamber is, as usual, communicable through an intake valve 24 with an intake manifold 26 forming part of the intake system of the engine. Further, the combustion chamber is, as usual, communicable through an exhaust valve 28 with a siamesed exhaust port 30 in which the exhaust ports from the two adjacent cylinders $C_1$ and $C_2$ are joined in the cylinder head (no numeral). The siamesed exhaust port 30 is in turn connected to an exhaust gas purifying device 32 or a thermal reactor. The exhaust gas purifying device 32 may be a catalytic converter or an intake manifold functioning to thermally oxidize the unoxidized constituents in the exhaust gases.

Figure 3:
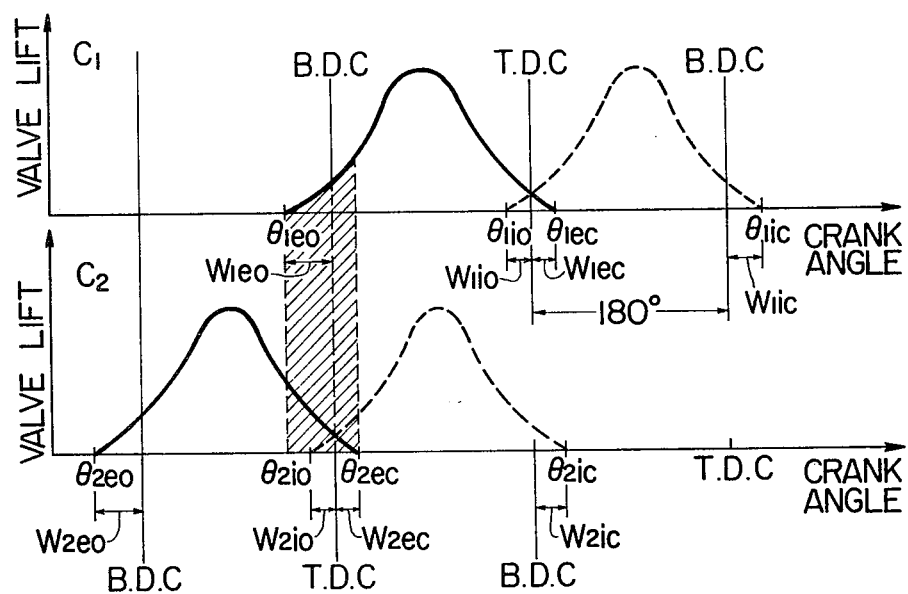
FIG. 3 is a graph showing the valve timings of the intake and exhaust valves of two cylinders of the engine of FIG. 2.

In this case, the firing order of the engine is set to be $C_1$-$C_3$-$C_4$-$C_2$ and consequently the valve timings of the intake valves and exhaust valves disposed in the first and second cylinders $C_1$ and $C_2$ are scheduled as shown in FIG. 3 in which solid curves represent the valve timings of the exhaust valves and dotted curves represent those of the intake valves. As seen in FIG. 3, the exhaust valve of the first cylinder $C_1$ starts, at a crank angle of $\theta_1 eo$, to commence the discharge of exhaust gases from the cylinder $C_1$ before the discharge of the exhaust gases from the second cylinder $C_2$ is completed at a crank angle of $\theta_2 ec$ at which the exhaust valve of the second cylinder $C_2$ is completely closed. Thus, the exhaust gas flow of the exhaust gases discharged from the second cylinder $C_2$ is obstructed by the exhaust gas flow discharged from the first cylinder $C_1$ within an oblique lined portion in FIG. 3. Therefore, the present invention intends to decrease the oblique lined portion as compared with conventional engines and accordingly to overcome the drawbacks encounted in the conventional engines having siamesed exhaust ports.

In order to reduce this oblique lined portion, that is to say, in order to shorten an overlap time during which both the exhaust gases from cylinders $C_1$ and $C_2$ flow in the siamesed port 30, the closing timing of the exhaust valve of the second cylinder $C_2$ at a crank angle $\theta_2 ec$ is advanced and/or the opening timing of the exhaust valve of the first cylinder $C_1$ at a crank angle of $\theta_1 eo$ is retarded as compared with those of conventional engines.

Moreover, within the oblique lined portion in FIG. 3, both the exhaust and intake valves of the second cylinder $C_2$ are open, called "valve overlap", and at the same time the exhaust valve of the first cylinder $C_1$ is also open. Accordingly, in the case adopting the siamesed exhaust port, there is the possibility that the exhaust gas in the first cylinder $C_1$ flows backward to the intake system through the exhaust valve of the second cylinder $C_2$ as described before. It seems that this exhaust gas backward flow contributes to a decrease of power output of the second cylinder $C_2$ as compared with the above-discussed obstruction of the exhaust gas flow. In view of this, it is required that the valve overlap between the intake and exhaust valves of the second cylinder $C_2$ is decreased.

Experiments revealed the following facts: it was effective for attaining the intention of the present invention that an interval ($W_1eo$) between an opening timing ($\theta_1eo$) at which the exhaust valve of the first cylinder $C_1$ starts to open and a bottom dead center (B. D. C.) is smaller, by about 5° or more in terms of crank angle, than an interval ($W_2eo$) between an opening timing ($\theta_2eo$) at which the exhaust valve of the second cylinder $C_2$ starts to open and a bottom dead center. It was also effective for the same purpose that an interval ($W_2ec$) between a closing timing ($\theta_2ec$) at which the exhaust valve of the second cylinder $C_2$ starts to close and a top dead center (T. D. C.) is smaller, by about 5° or more, than an interval ($W_1ec$) between a closing timing ($\theta_1ec$) at which the exhaust valve of the first valve $C_1$ closes and a top dead center. Furthermore, it was also effective that an interval ($W_2io$) between an opening timing ($\theta_2io$) at which the intake valve of the second cylinder $C_2$ starts to open and the top dead center is smaller, by about 5° or more, than an interval ($W_1io$) between an opening timing ($\theta_1io$) at which the intake valve of the first cylinder $C_1$ starts to open and the top dead center. In this case, the above-mentioned intervals are scheduled so that $W_1eo \geq 0$, $W_2ec \geq 0$ and $W_2io \geq 0$ in terms of crank angle in order to maintain stable engine operation or satisfactory driveability of the engine.

It will be understood that the positive and negative relationships in the above-mentioned various timing intervals are determined relative to the top dead center or the bottom dead center.

The above-mentioned facts teach that the preventing effect of the above-mentioned exhaust gas interference decreases as the difference of the above-mentioned interval ($W_2eo - W_1eo$, $W_1ec - W_2ec$, $W_1io - W_2io$) decreases. The engine driveability is deteriorated, when the above-mentioned intervals are that $W_1eo < 0$, $W_2ec < 0$, and $W_2io < 0$ in terms of crank angle.

Further, it is effective for preventing the above-mentioned backward flow of the exhaust gases to the intake system, that the valve overlap ($W_2io + W_2ec$) of the second cylinder $C_2$ is smaller, by about 5° or more in terms of crank angle, than the valve overlap ($W_1io + W_1ec$) of the first cylinder $C_1$.

In connection with the above, referring back to FIG. 2, the reference numeral 34 schematically denotes a device or means for adjusting or setting the valve timings of the intake and exhaust valves 24 and 28 in accordance with the above-discussed manner for attaining the purpose of the present invention. This device 34 typically comprises a cam shaft, the cam followers and the lifters attached to the valves, as is known in the art and therefore its detailed description is omitted for the purpose of simplicity of explanation. In order to thus adjust the valve timings, it is desirable to modify the cam profile or cam contour of a camshaft's cam in accordance with the requirements of valve timings, to use a so-called hydraulic valve lifter which follows the camshaft's cam contour and converts cam geometry to reciprocating motion, or modify the angle of the camshaft's cam relative to the camshaft. The device 34 also functions to set the valve timings to meet the above-mentioned firing order, in other words, so that the time interval from the exhaust valve opening timing of the first cylinder $C_1$ to the exhaust valve opening timing of the second cylinder $C_2$ is larger than the time interval from the exhaust valve opening timing of the second cylinder $C_2$ to the exhaust valve opening timing of the first cylinder $C_1$.

Figure 4:
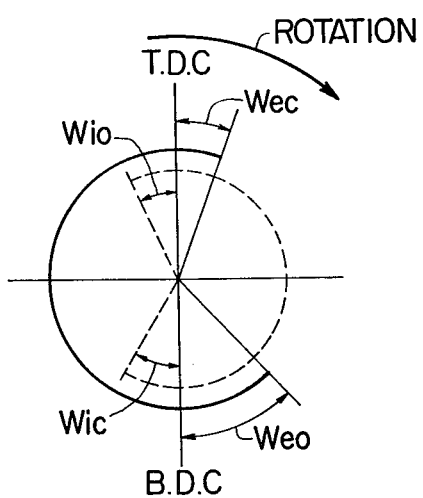
FIG. 4 is a diagram showing the valve timings of the intake and exhaust valves of each cylinder of the engine of FIG. 2.

FIG. 4 shows the valve timings of the intake and exhaust valves 24 and 28 disposed in each cylinder of the engine shown in FIG. 2, in which a part of solid circle represents the exhaust valve and a part of dotted circle represents the intake valve. In this figure, Weo corresponds to the above-mentioned interval of $W_1eo$ or $W_2eo$; Wec corresponds to the above-mentioned interval of $W_1ec$ or $W_2ec$; Wio corresponds to the above-mentioned interval of $W_1io$ or $W_2io$; and Wic corresponds to the above-mentioned interval of $W_1ic$ or $W_2ic$.

While the above-discussed adjusting manner of the valve timings has been shown and described only with respect to the valves disposed in the first and second cylinders $C_1$ and $C_2$, it will be understood that the valve timings of the valves disposed in the third and fourth cylinders $C_3$ and $C_4$ are similarly adjusted. It will also be understood that the above-discussed adjusting manner of the valve timings may be adapted to eight cylinder engines.

What is claimed is:

1. In a multi-cylinder internal combustion engine including first and second cylinders, a crankshaft, first and second pistons reciprocally mounted in said first and second cylinders and attached to said crankshaft, a siamesed exhaust port communicable with both of said first and second cylinders, a plurality of intake ports, a first intake valve through which the first cylinder is communicable with a first intake port of the engine, a second intake valve through which the second cylinder is communicable with a second intake port of the engine, a first exhaust valve through which the first cylinder and the siamesed exhaust port are communicable, and a second exhaust valve through which the second cylinder and the siamesed exhaust port are communicable, wherein the intake valves begin to open before top dead center of crank rotation and close after bottom dead center of crank rotation, and wherein the exhaust valves begin to open before bottom dead center and close after top dead center of crank rotation, the improvement comprising: means for establishing valve timing of the first intake and exhaust valves and the second intake and exhaust valves, said timing established with respect to the top dead center and bottom dead center positions of the pistons in the respective cylinders, said means setting the timing of said first cylinder differently with respect to the timing of said second cylinder to reduce exhaust valve opening overlap of said first and second cylinders.

2. An engine as claimed in claim 1, wherein said means for establishing sets a first timing interval ($W_1eo$) between the opening timing ($\theta_1eo$) of said first exhaust valve and the bottom dead center of said first piston is smaller than a second timing interval ($W_2eo$) between the opening timing ($\theta_2eo$) of said second exhaust valve and the bottom dead center of said second piston.

3. An engine as claimed in claim 1, wherein said means for establishing sets a third timing interval ($W_2ec$) between the closing timing ($\theta_2ec$) of said second exhaust valve and the top dead center of said second piston is smaller than a fourth timing interval ($W_1ec$) between the closing timing ($\theta_1ec$) of said first exhaust valve and the top dead center of said first piston.

4. An engine as claimed in claim 1, wherein said means for establishing sets the valve opening overlap ($W_2io + W_2ec$) of said second intake and exhaust valves at less than the valve opening overlap ($W_1io + W_1ec$) of said first intake and exhaust valves.

5. An engine as claimed in claim 2 or 3, further comprising means for establishing valve timings of the first and second intake valves and the first and second exhaust valves to achieve a third operation wherein valve opening overlap ($W_2io + W_2ec$) of the second intake and exhaust valves is smaller than valve opening overlap ($W_1io + W_1ec$) of said first intake and exhaust valves.

6. An engine as claimed in claim 5, further comprising means for establishing valve timings of said first and second intake valves so that a fifth timing interval ($W_2io$) between the opening timing ($\theta_2io$) of said second intake valve and the top dead center of said second piston is smaller than a sixth timing interval ($W_1io$) between the opening timing ($\theta_1io$) of said first intake valve and the top dead center of said first piston.

7. An engine as claimed in claim 2 or 3, wherein the first timing interval ($W_1eo$) is smaller than the second timing interval ($W_2eo$) by at least about 5 degrees in terms of crank angle.

8. An engine as claimed in claim 2 or 3, wherein the third time interval ($W_2ec$) is smaller than the fourth timing interval by at least about 5 degrees in terms of crank angle.

9. An engine as claimed in claim 6, wherein the fifth timing interval ($W_2io$) is smaller than the sixth timing interval ($W_1io$) by at least about 5 degrees in terms of crank angle.

10. An engine as claimed in claim 5, in which the valve opening overlap ($W_2io + W_2ec$) of the second intake and exhaust valves is smaller than the valve opening overlap ($W_1io + W_1ec$) of the first intake and exhaust valves by at least about 5 degrees in terms of crank angle.

11. The engine as claimed in claim 2 or 3, comprising a four-cylinder engine.

12. The engine as claimed in claim 2 or 3, comprising an eight-cylinder engine.

13. A method for operating a multi-cylinder internal combustion engine including first and second cylinders, a crankshaft, first and second pistons reciprocally mounted on said first and second cylinders and attached to said crankshaft, a siamesed exhaust port communicable with both of said first and second cylinders, a plurality of intake ports, a first intake valve through which the first cylinder is communicable with a first intake port of the engine, a second intake valve through which the second cylinder is communicable with a second intake port of the engine, a first exhaust valve through which the first cylinder and the siamesed exhaust port are communicable, and a second exhaust valve through which the second cylinder and the siamesed exhaust port are communicable, wherein the intake valves being to open before top dead center of crank rotation and close after bottom dead center of crank rotation, and wherein the exhaust valves begin to open before bottom dead center and close after top dead center of crank rotation, said method comprising the step of establishing the valve timing of said first intake and exhaust valves and said second intake and exhaust valves, said timing established with respect to the top dead center and bottom dead center positions of the pistons in the respective cylinders, said step setting the timing of first cylinder differently with respect to the timing of said second cylinder to reduce exhaust valve opening overlap of said first and second cylinders.

14. A method as claimed in claim 13, wherein said step includes setting a first timing interval ($W_1eo$) between the opening timing ($\theta_1eo$) of said first exhaust valve and the bottom dead center of said first piston to less than a second timing interval ($W_2eo$) between the opening timing ($\theta_2eo$) of said second exhaust valve and the bottom dead center of said second piston.

15. A method as claimed in claim 13, wherein said step includes setting a third timing interval ($W_2ec$) between the closing timing ($\theta_2ec$) of said second exhaust valve and the top dead center of said second piston to less than a fourth timing interval ($W_1ec$) between the closing timing ($\theta_1ec$) of said first exhaust valve and the top dead center of said first piston.

16. A method as claimed in claim 13, wherein said step includes setting the valve opening overlap ($W_2io + W_2ec$) of said second intake and exhaust valves to less than the valve opening ($W_1io + W_1ec$) of said first intake and exhaust valves.

17. A method as claimed in claim 14 or 15, further comprising the step of establishing valve timings of the first and second intake valves and the first and second exhaust valves to achieve a third operation wherein valve opening overlap of the second intake and exhaust valves is smaller than valve opening overlap of said first intake and exhaust valves.

18. A method as claimed in claim 17, further comprising the step of establishing valve timings of the first and second intake valves so that a fifth timing interval ($W_2io$) between the opening timing ($\theta_2io$) of the second intake valve and the top dead center of said second piston is smaller than a sixth timing interval ($W_1io$) between the opening timing ($\theta_1io$) of the first intake valve and the top dead center of said first piston.

19. A method as claimed in claim 14 or 15, in which the first timing interval ($W_1eo$) is smaller than the second timing interval ($W_2eo$) by at least about 5 degrees in terms of crank angle.

20. A method as claimed in claim 14 or 15, in which the third timing interval ($W_2ec$) is smaller than the fourth timing interval ($W_1ec$) by at least about 5 degrees in terms of crank angle.

21. A method as claimed in claim 18, in which the fifth timing interval ($W_2io$) is smaller than the sixth timing interval ($W_1io$) by at least about 5 degrees in terms of crank angle.

22. A method as claimed in claim 13, in which the valve opening overlap ($W_2io + W_2ec$) of the second intake and exhaust valves is smaller than the valve opening overlap ($W_1io + W_1ec$) of the first intake and exhaust valves by at least about 5 degrees in terms of crank angle.

* * * * *